United States Patent [19]
Foley et al.

[11] Patent Number: 5,642,645
[45] Date of Patent: Jul. 1, 1997

[54] HERMETICALLY SEALED HARMONIC DRIVE TRANSMISSION MANUFACTURE

[75] Inventors: Steven J. Foley, Stoneham; Joseph A. Michaud, Peabody, both of Mass.

[73] Assignees: Teijin Seiki Boston, Inc.; Harmonic Drive Technologies, both of Peabody, Mass.

[21] Appl. No.: 533,394

[22] Filed: Sep. 25, 1995

[51] Int. Cl.$^6$ .................. F16H 1/00; F16H 1/32
[52] U.S. Cl. ........................................... 74/640
[58] Field of Search .......................... 74/640

[56] References Cited

U.S. PATENT DOCUMENTS

| | | | |
|---|---|---|---|
| 2,929,266 | 3/1960 | Musser | 74/640 |
| 3,196,713 | 7/1965 | Robinson | 74/640 |
| 3,424,432 | 1/1969 | Humphreys | 74/640 |

FOREIGN PATENT DOCUMENTS

| | | | |
|---|---|---|---|
| 1-182656 | 7/1989 | Japan | 74/640 |
| 2-186151 | 7/1990 | Japan | 74/640 |
| 2006731 | 1/1994 | Russian Federation | 74/640 |
| 648768 | 2/1979 | U.S.S.R. | 74/640 |
| 1562567 | 5/1990 | U.S.S.R. | 74/640 |
| 1714247 | 2/1992 | U.S.S.R. | 74/640 |

OTHER PUBLICATIONS

"Harmonic Drive" (Hermetically Sealed Actuators), USM Corp. Gear Systems Division 1961.

"The Harmonic Drive", United Shoe Machinery Corporation 1960.

*Primary Examiner*—Khoi Q. Ta
*Attorney, Agent, or Firm*—Don Halgren

[57] ABSTRACT

The present invention comprises a harmonic drive transmission assembly for use in contamination free manufacturing fields such as computer chip making. The harmonic drive unit includes a flexspline having a diaphragm at one end and an outwardly flared lip adjacent its other end which is integrally connected to a mounting flange. The flexspline including the diaphragm and mounting flange are all integral with one another, all being machined from a single piece of steel bar stock.

2 Claims, 3 Drawing Sheets

HERMETICALLY SEALED HARMONIC DRIVE TRANSMISSION MANUFACTURE

BACKGROUND OF INVENTION

1. Field of the Invention

This invention relates to harmonic drive transmissions, and more particularly to the manufacture and use of hermetically sealed harmonic drive transmissions.

2. Prior Art

Harmonic drive devices have been utilized for quite a few years, wherever a lightweight, compact, high ratio transmission of power is needed. All harmonic drive transmissions employ three basic elements. Those elements are a circular spline, a flexspline, and a wave generator, assembled normally with the circular spline fixed in a non-rotating arrangement, with the flexspline rotating as the output element. The wave generator, which typically functions as the input element, would be rotated by a primary power source. Teeth on the flexspline and the circular spline are cut to the same circular pitch. However, the flexspline is somewhat smaller in circumference than the circular spline, and it has fewer teeth. The numerical difference in the number of teeth is always a multiple of the number of lobes on the wave generator.

An early example of a harmonic drive transmission, is shown in U.S. Pat. No. 2,969,266 to C. W. Musser, was issued Mar. 22, 1960, the Patent being entitled "StrainWave Gearing Tubular Shaft". Since that time, harmonic drive transmissions have been used for azimuth drives or antenna systems, or rotary cable drives for welding positioners, for valve actuators, for consumer products such as door openers or actuators or automotive closures, for microscope focusing knobs or for steering mechanisms on rocket booster propulsion systems.

There are certain industries, however, where rotary power is needed, yet contamination from any part of the machinery within the worked field would be critical to the work product. The provision of positive, accurately controlled transmission of motion through an uninterrupted metallic barrier is desired, also in those certain fields. Since no packing, bellows or fallible seal is used, some containment of contamination utilizing a harmonic drive transmission, may be obtained. Such a unit is shown in U.S. Pat. No. 3,196,713 to H. A. Robinson, issued in Jul. 27, 1965, entitled "Hermetically Sealed Transmissions". Such a unit may provide typical rotary-to-rotary power utilizing the same three basic components of harmonic drive transmissions, but their configuration has been altered to meet the specific feed through requirement. The flexspline is a flexible walled tube with one end closed by welding its edge to a disc or diaphragm, and the other end of the tube is bolted or welded to a mounting flange. The wave generator, operating inside the stationary flexspline deflects the walls of the tube and flexspline combination into engagement with the circular spline, which functions as the output member and delivers a rotation in the same direction as the input.

It is an object however of the present invention, to provide an improvement over the hermetically sealed transmissions of the prior art harmonic drive units.

It is yet a further object of the present invention, to provide a hermetically sealed harmonic drive transmission which may be utilized in a field where contamination of any sort would be absolutely critical to the product being produced.

BRIEF SUMMARY OF THE INVENTION

The present invention relates to a process of the manufacturing of a hermetically sealed harmonic drive transmission which will be utilized in environments where contamination would be critical, such as in the electronic industry in the manufacture of computer chips.

In the manufacturing of the present invention, a flexspline of a flaring shape will be shown, of a shape similar to that shown in U.S. Pat. No. 3,196,713, incorporated here in the reference, though it would be understood that a flexspline of different shape may be employed, for example, one cup-shaped.

In accordance with the features of the present invention, the closed end flexspline and the mounting flange to which a normal flexspline would be otherwise attached, is made of one unitary piece of forging. Such a piece forging is made from a bar of stainless steel shaped something like a bell. The forging is placed in a turning center of an appropriate milling machine, on which the outside diameter is machined down to a rough tooling dimension. The bar is then re-chucked on that outside diameter. Then the inside diameter may be drilled to its rough internal diameter. The solid bar comprising the flexspline is again re-chucked, located against its dimension to another tooling dimension on its rough external shape.

The rough flexspline stock is next re-chucked on that tooling dimension, to permit the final finish internal configuration to be machined. The flexspline now has an end cap, called a diaphragm, which is solid and integral with the walls of the bell shaped flexspline, and the walls of the flexspline critically are also integral with its mounting flange.

The outside final diameter of the combination flexspline with the integral mounting flange and diaphragm is now finished by placing the flexspline assembly on a turning mandrel. The combination mandrel and flexspline assembly is placed into an alignment fixture. One end of the alignment fixture includes a housing having a piston with a spring loaded cup which presses against the diaphragm of the flexspline assembly. A vacuum is created in the head of the alignment fixture to evacuate air from the bore of the flexspline assembly.

The alignment mandrel, as known in the art, is utilized to support the hollow flexspline cup during the machining operation in which the outer wall is turned down to 0.010 inches and the diaphragm is turned down to 0.020 inches. A low melting point alloy steel known as Sera Metal 117, sold by the Sera Metal Company, is poured into the bottom of the holding mandrel. The low melting point of alloy steel runs through a plurality of channels in the holding mandrel, and into the bore of the flexspline cup.

The holding mandrel with the flexspline cup assembly thereon, having the low melting point alloy steel therewithin, is installed onto a lathe for final turning of the walls to the thin outer diameter.

After the diaphragm, the flexspline walls, and mounting flange are all turned to the appropriate outer configuration, the mandrel with the flexspline assembly thereon is removed and the combination is heated to just above the melting pointing of the low melting point alloy steel, to for example, about 130 degrees Fahrenheit, wherein the mandrel and alloy are removed from the flexspline assembly.

The harmonic drive unit includes a first drive shaft having a distal end which is secured to a flange, which flange is bolted to the first closed end of a circular spline. The circular spline comprises annular ring having a second end on which there is disposed an array of circular spline teeth. The closed end of the flared or bell shaped flexspline is disposed within the bore of the circular spline. The flexspline includes a cup shaped wall having a diaphragm across its distal end. The bell shaped or flared end of the flexspline is integral with the mounting flange. The flexspline assembly thus critically being made of one unitary piece of stock to absolutely prevent leakage of gases or contaminants through the flexspline, which could occur if the diaphragm were welded to the wall of the flexspline. A solid forging of stock also permits the grains of the steel forming the walls and diaphragm to be oriented in a more leakproof way (that is, parallel to the walls) than if the flexspline were made any other way. The annular array of flex- spline teeth is engaged with the circular spline teeth. The flexspline teeth are disposed on the outwardly radially directed edge of the walls of the flexspline. An annular wave generator is disposed radially inwardly of the flexspline teeth. A wave generator is mounted on an input shaft which extends through a wall opening in a housing, which housing is utilized for the manufacture of contamination-free components, such as computer chips or sophisticated electronic devices. The annular wave generator has two or more lobes thereon, as is known in the harmonic drive transmission field. A ball bearing assembly is disposed on the radially outer periphery of the annular wave generator. The bearing assembly comprises an inner bearing race, an outer bearing race and a plurality of roller balls spaced circumferentially therebetween.

The mounting flange which is critically integral to the flexspline, may be welded or bolted along its annular periphery, to the wall of the housing in which the products to be made, to insure contamination free utilization of the harmonic drive transmission capabilities. The welding along this juncture does not have flexing forces acting upon it as does the diaphragm and flexspline walls.

In operation of the harmonic drive assembly, as is known in the art, the drive shaft rotates the circular spline about the stationary bell shaped (flared) flexspline. Rotation about the flared flexspline induces a wave motion within the flexspline teeth and hence a rotary motion within the annular wave generator. That rotary motion within the annular wave generator causes rotary motion within the input shaft, to drive the appropriate mechanism within the housing of the contamination free production area.

The invention thus comprises a method of manufacturing of a harmonic drive flex-spline assembly, including a flexspline cup having an integral diaphragm at one closed end and an integral mounting flange at its other open end, comprising the steps of arranging a solid steel forging in a chuck arrangement in a metal turning machine, drilling a center bore within the solid steel forging, turning the external surface of the solid steel forging to a preset outside dimension, machining the integral mounting flange on the open proximal end of the flexspline assembly, to its finished outer configuration. The method also includes the steps of placing the rough turned solid steel forging into a machine tool for full bore drilling of the internal diameter of said flexspline cup assembly, placing the finished internal bore onto a turning mandrel for support of said flexspline assembly, suction drawing a low melting point alloy steel into the flex-spline cup assembly for internal annular support of the flexspline walls during subsequent machining operations, supporting the turning mandrel in a turning machine, while turning the flexspline walls down to its finished dimension of about 0.010 inches and the integral diaphragm down to a thickness of 0.020 inches.

In another aspect of invention comprises a harmonic drive transmission device for the transmission of rotary energy from an input source to an output mechanism within a wall of a sealed housing while providing a hermetically sealed relationship to the output shaft within the sealed housing, comprising an input shaft having a wave generator arranged at one end thereof, the wave generator rotatively disposed within a unitary flexspline having a unitary diaphragm and mounting flange therewith, a circular spline rotatively supported around the flexspline in a gear tooth motion communicating relationship therewith, the flexspline having a side wall, the diaphragm and the mounting flange all machined from a single solid forging of steel, so that the arrangement of gear teeth on the flexspline and the circular spline engage one another in an advancing wave, to permit rotary motion to be provided to an output shaft, which output shaft actuates a mechanism within a hermetically sealed contamination-free production housing. The unitary mounting flange is attached to the inner side of said housing, to minimize the likihood of contamination from components within the flexspline itself.

BRIEF DESCRIPTION OF THE DRAWINGS

The objects and advantages of the present invention will become more apparent, when viewed in conjunction with the following drawings, in which.

DESCRIPTION OF THE PREFERRED EMBODIMENTS

The present invention relates to a process of the manufacturing of a hermetically sealed harmonic drive transmission which will be utilized in environments where contamination would be critical, such as in the electronic industry in the manufacture of computer chips.

In the manufacturing of the present invention, a flexspline of a flaring or bell shape will be shown, of a shape similar to that shown in U.S. Pat. No. 3,196,713, incorporated here in the reference, though it would be understood that a flexspline of different shape may be employed, for example, one cup-shaped.

Figure 1:
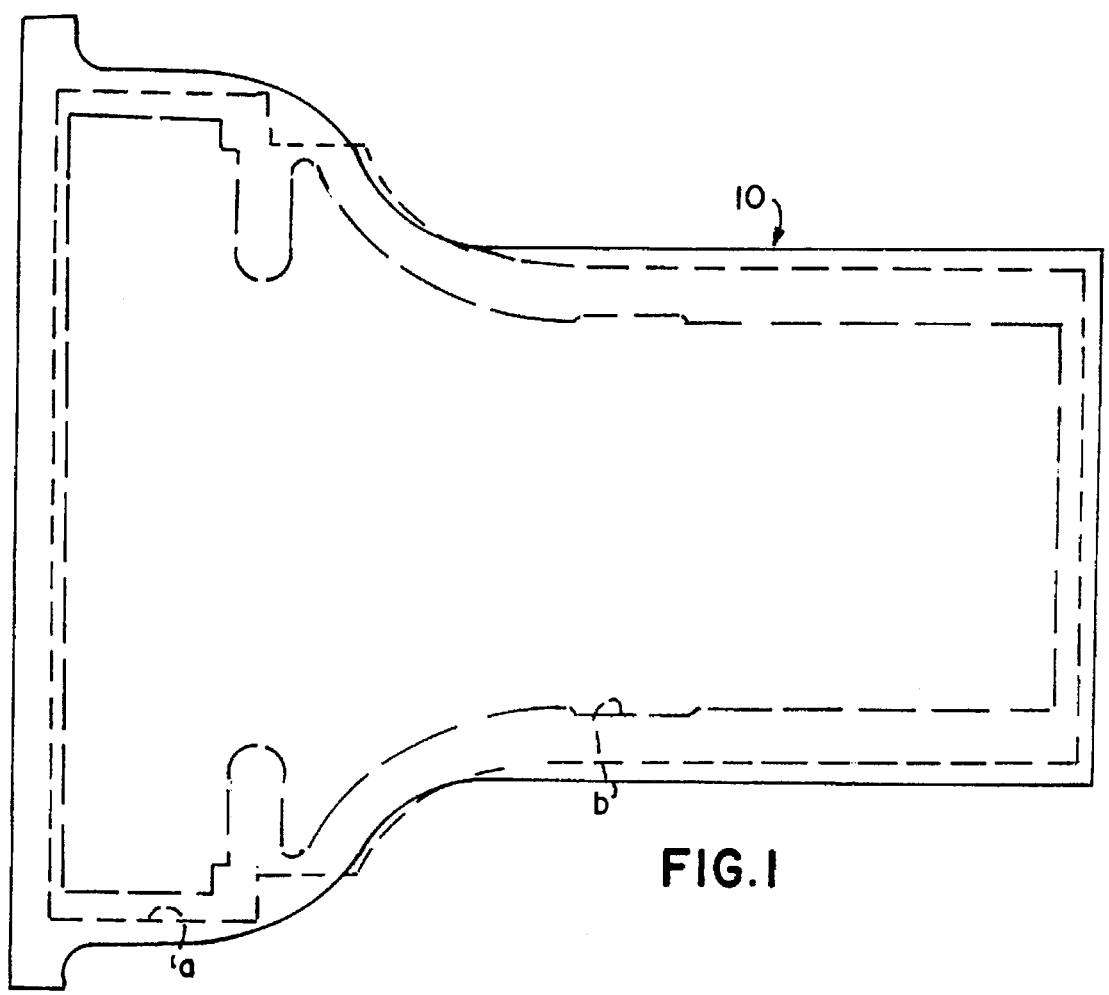
FIG. 1 is a side elevational view of a flexspline forging with the outer diameter profile steps overlaid thereon showing such outer profiles the flexspline is constructed according to the principles of the present invention.
Figure 2A:
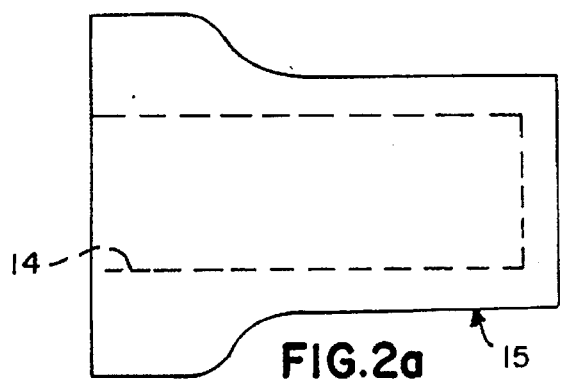
FIGS. 2a, b, c, and d, are views similar to FIG. 1, showing the step wise process in the manufacture of a flexspline assembly according to the principles of the present invention.
Figure 2B:
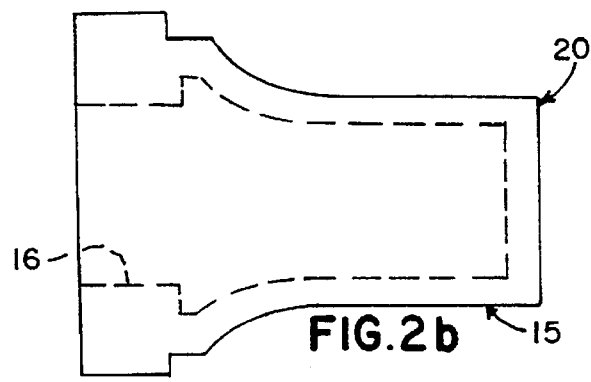

In accordance with the features of the present invention, the flexspline and the mounting flange to which a normal flexspline would be attached, is made of one unitary piece of forging 10, as shown in FIG. 1. Such a piece of forging 10 is made from a bar stock of stainless steel. Such a bar is placed in a chuck of an appropriate turning center of a lathe. The flexspline 15 is then machined to its rough external shape and later to is final external shape, as shown by the outside profile lines of step 1 "a" and step 2 "b". The rough outline is also shown in FIG. 2a. The initial rough internal outline is shown as dashed line 14 in FIG. 2a, and the next rough bore shape is shown by line 16 in FIG. 2b.

Figure 2C:
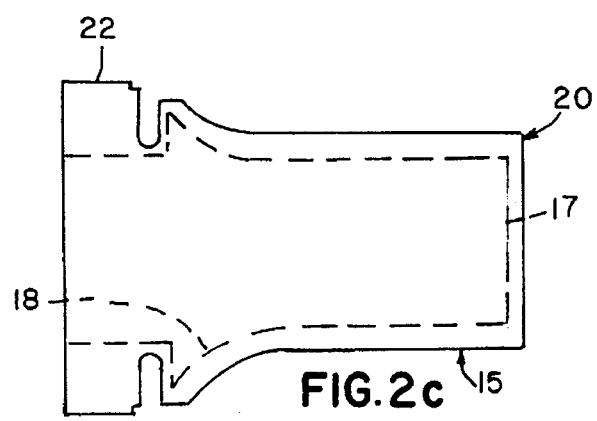
Figure 2D:
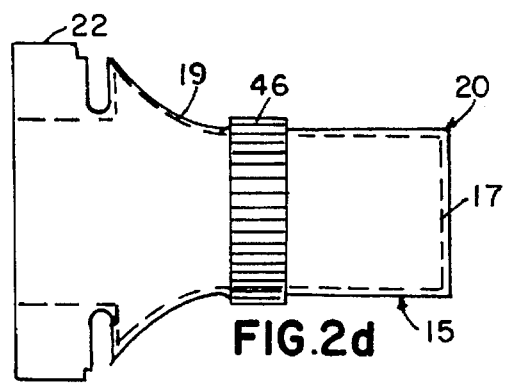

The rough flexspline stock is next re-chucked to permit the final inside finish internal bore configuration to be machined to the shape indicated by the dashed lines 18, as shown in FIG. 2c. The flexspline 15 now has an "end cap" 20, which includes the diaphragm 17, which is solid and integral with the walls of the flute (bell) shaped flexspline 15. The walls 19 of the flexspline critically are also integral with its mounting flange 22, as shown in FIG. 2d.

The outside final diameter of the combination flexspline 15 with the integral mounting flange 22 and diaphragm 17 is finished by placing the flexspline assembly 15 on a turning mandrel, not shown. The combination mandrel and the flexspline assembly 15, are placed into an alignment fixture, also not shown, for clarity. One end of the alignment fixture includes a housing having a piston with a spring loaded cup which presses against the diaphragm of the flexspline assembly. A vacuum is created in the head of the alignment fixture to evacuate air from the bore 14 of the flexspline 15 to permit the Cerra metal to totally fill the bore of the flexspline 15.

The alignment mandrel, as known in the art, is utilized to internally support the hollow flexspline 15 during the machining operation. In that operation, the outer wall 19 is turned down to about 0.010 inches and the diaphragm 17 is turned down to about 0.020 inches, as shown in finished state in FIG. 2d. A low melting point alloy steel known as Cerro 117 steel, is ladelled into the bottom of the holding mandrel. The low melting point of alloy steel runs through a plurality of channels in the alignment mandrel, and into the bore of the flexspline 15, to fill up the evacuated space and internally support the flexspline 15.

The holding mandrel with the flexspline assembly 15 thereon, having the low melting point alloy steel therewithin, is installed onto a lathe, not shown, for clarity, for final turning of the walls 19 and diaphragm 17, to the thin outer dimensions.

After the diaphragm 17, the flexspline walls 19, and mounting flange 22 are all turned to the appropriate outer configuration, as shown in FIG. 2d, the mandrel with the flexspline assembly 15 thereon is removed and the combination is heated to just above the melting pointing of the low melting point alloy steel, for example, to about 130 degrees Fahrenheit, wherein the mandrel and alloy are removed from the flexspline assembly 15.

Figure 3:
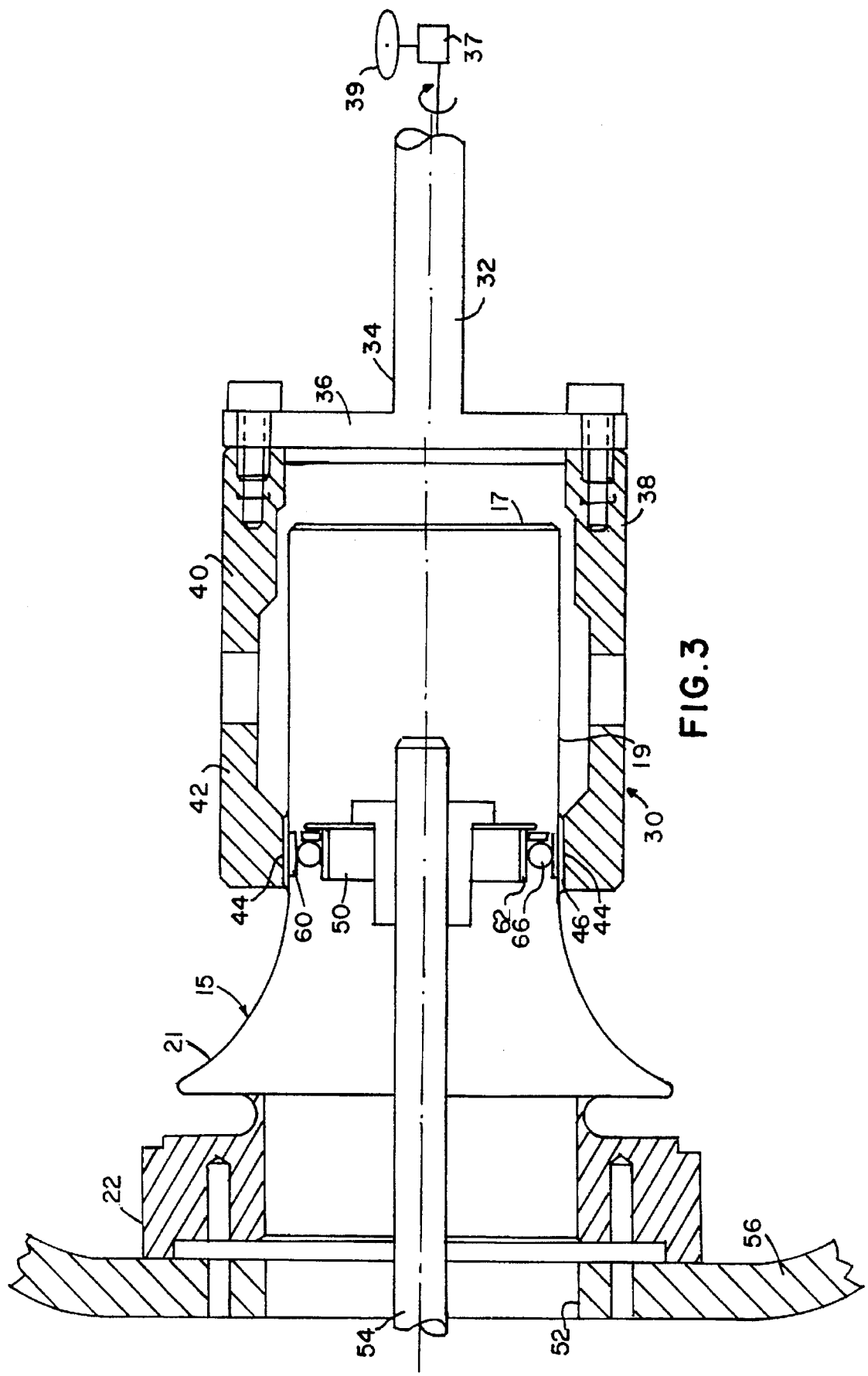
FIG. 3 is a side elevational view, partly in section, of part of a harmonic drive assembly secured to a housing where contamination free parts are manufactured.

The finished flexspline 15 is a component of a harmonic drive assembly 30, as shown in FIG. 3, which includes a first output shaft 32 having a distal end 34 which is secured to a flange 36. The flange 36 is bolted to the first closed end 38 of a circular spline 40. The circular spline 40 comprises a rigid annular housing having a second end 42 on which there is disposed an array of radially inwardly directed circular spline teeth 44. The closed diaphragm end 17 of the flared flexspline 15 is disposed within the bore of the circular spline 40. The flared flexspline 15 includes a cup shaped wall having its diaphragm 17 across its distal end. The flared end 21 of the flexspline 15 critically is integral with the mounting flange 22. The flexspline assembly thus critically being made of one unitary piece of stock to absolutely prevent leakage of gases or contaminants through the flexspline 15, which could occur if the diaphragm 17 and the walls 19 were separate pieces welded to one another to make the flexspline, as is done in the prior art. A machined unitary flexspline and mounting flange machined from a solid forged bar also permits the grains of the steel forming the walls and diaphragm to be oriented (parallel to the walls) in a more leakproof way than if the flexspline were made any other way. The annular array of flexspline teeth 46 is engaged with the circular spline teeth 44. The flexspline teeth 46 are disposed on the outwardly radially directed edge of the walls 19 of the flexspline 15.

An annular wave generator 50 is disposed radially inwardly of the flexspline teeth 46, as shown in FIG. 3. The wave generator 50 is mounted on an input shaft 54 which extends through a wall opening 52 in a housing 56, which housing 56 may be utilized for the location and containment/ manufacture of contamination-free components, such as computer chips or sophisticated electronic devices. The annular wave generator 50 has two or more lobes thereon, as is known in the harmonic drive transmission field. A ball bearing assembly 60 is disposed on the radially outer periphery of the annular wave generator 50. The bearing assembly 60 comprises an inner bearing race 62, an outer bearing race 64 and plurality of roller balls 66 spaced circumferentially therebetween.

The mounting flange 22 which is critically integral to the flexspline 15, may to be welded or bolted along its annular periphery, to the wall of the housing in which the products to be made, to insure contamination free utilization of the harmonic drive transmission capabilities.

In operation of the harmonic drive assembly 30, as is known in the art, the input shaft 54 rotates the lobed wave generator within the stationary flared flexspline 15. Rotation of the wave generator open end of the flexspline to a housing. The mounting flange being considerably heavier and thicker than the flexspline, sufficient to provide the anchoring and stability needed, while the walls of the flexspline where the radially outwardly directed teeth are, may have a wave-like motion imparted therein. Rotation of the wave generator 50 within the flared flexspline 15 thus induces rotary motion within the circular spline 40 and hence a rotary motion within the output shaft 32. That rotary motion within the output shaft 32 causes rotary motion to drive an appropriate gearing 37 to turn production mechanisms such as a carousel 39 or X-ray lithography equipment for the manufacture of electronic chips or like substrates where contamination from anything including that which might come from gear transmissions and get within the housing 56 of the contamination free production area. The harmonic drive assembly 30 in the prefferred embodiment is arranged on the inner side of the wall comprising the housing 56, so that the bearings 66, the wave generator 50 and the input shaft 54 are not being exposed to any atmosphere within the housing 56, which might otherwise contaminate any product being manufactured therewithin, and the evacuated area of the production housing is exposed only to the area radially outwardly of the flexspline, and not to the bearings and associated mechanisms therewithin.

We claim:

1. A harmonic drive transmission device for the transmission of rotary energy from an input source to an output mechanism within a wall of a sealed housing while providing a hermetically sealed relationship to said output shaft within said sealed housing, said wall of said sealed housing having an inner side, said harmonic drive transmission device further comprising:

an input shaft having a wave generator arranged at one end thereof, said wave generator rotatively disposed within a unitary flexspline having a unitary diaphragm and mounting flange therewith;

a circular spline rotatively supported around said flexspline in a gear tooth motion communicating relationship therewith;

said flexspline having a side wall, said diaphragm and said mounting flange all of which are machined from a single solid forging of steel, so that the arrangement of gear teeth engage one another in an advancing wave, to permit rotary motion to be provided to an output shaft, which output shaft actuates a mechanism within a hermetically sealed contamination-free production housing.

2. The harmonic drive transmission device as recited in claim 1, wherein said unitary mounting flange is attached to said inner side of said wall of said housing.

* * * * *